(12) United States Patent
Teramoto et al.

(10) Patent No.: US 7,692,689 B2
(45) Date of Patent: Apr. 6, 2010

(54) IMAGING-ELEMENT UNIT AND IMAGING DEVICE

(75) Inventors: Togo Teramoto, Hachioji (JP);
Masataka Hamada, Takatsuki (JP)

(73) Assignee: Konica Minolta Opto, Inc., Tokyo (JP)

( * ) Notice: Subject to any disclaimer, the term of this patent is extended or adjusted under 35 U.S.C. 154(b) by 388 days.

(21) Appl. No.: 11/894,899

(22) Filed: Aug. 22, 2007

(65) Prior Publication Data
US 2008/0049109 A1 Feb. 28, 2008

(30) Foreign Application Priority Data
Aug. 23, 2006 (JP) .............................. 2006-226317

(51) Int. Cl.
H04N 5/228 (2006.01)
H04N 5/225 (2006.01)
G03B 17/00 (2006.01)

(52) U.S. Cl. .................. 348/208.7; 348/374; 396/55

(58) Field of Classification Search ............. 348/208.7, 348/208.2, 208.11; 396/55
See application file for complete search history.

(56) References Cited

U.S. PATENT DOCUMENTS

| | | | | |
|---|---|---|---|---|
| 7,460,776 B2 * | 12/2008 | Hirunuma et al. ............. | 396/55 |
| 7,502,554 B2 * | 3/2009 | Enomoto ...................... | 396/55 |
| 7,505,677 B2 * | 3/2009 | Kim et al. ..................... | 396/55 |
| 7,519,282 B2 * | 4/2009 | Shin et al. ...................... | 396/55 |
| 7,529,476 B2 * | 5/2009 | Kurosawa ...................... | 396/55 |
| 7,558,473 B2 * | 7/2009 | Shin et al. ...................... | 396/55 |
| 7,613,390 B2 * | 11/2009 | Nomura et al. ............. | 396/542 |
| 2006/0017815 A1 * | 1/2006 | Stavely et al. ............. | 348/208.7 |
| 2006/0092285 A1 | 5/2006 | Shin | |
| 2006/0132613 A1 * | 6/2006 | Shin et al. ................. | 348/208.7 |
| 2008/0013939 A1 * | 1/2008 | Ogawa ........................ | 396/55 |
| 2008/0284860 A1 * | 11/2008 | Wu et al. .................. | 348/208.7 |
| 2008/0303907 A1 * | 12/2008 | Lee ........................... | 348/208.7 |
| 2009/0047009 A1 * | 2/2009 | Nagano ....................... | 396/55 |

FOREIGN PATENT DOCUMENTS

| | | |
|---|---|---|
| JP | 2006-133740 | 5/2006 |
| JP | 2007031094 A * | 2/2007 |

* cited by examiner

Primary Examiner—John M Villecco
(74) Attorney, Agent, or Firm—Cohen Pontani Lieberman & Pavane LLP (57) ABSTRACT

A compact and power saving imaging-element unit of handshake compensation type is provided. The imaging-element unit comprises an imaging-element board with an imaging element that performs photoelectric conversion of incident light formed or located thereon; a relay board that is disposed between the imaging element and an external control board, and that receives signals between the imaging-element board and the external control board; and a package with at least the imaging-element board and the relay board contained therein; wherein a slider mechanism is disposed between the imaging-element board and the relay board for moving the imaging-element board to compensate handshake of an imaging device.

9 Claims, 9 Drawing Sheets

120: HANDSHAKE COMPENSATION CONTROL IC
126: IMAGING ELEMENT CONTROLLER

120: HANDSHAKE COMPENSATION CONTROL IC
126: IMAGING ELEMENT CONTROLLER

FIG. 14

IMAGING-ELEMENT UNIT AND IMAGING DEVICE

BACKGROUND OF THE INVENTION

1. Field of the Invention

The present invention relates to an imaging device, and more particularly to an imaging-element unit that is capable of compensating handshake of the imaging device when taking images.

2. Description of the Prior Art

Currently, active handshake compensation technology that makes it possible to obtain clear and sharp images has been put into practical use. This shakiness-compensation technology are basically classified into three types: a type of moving a part of an imaging optical system; another type of moving the entire imaging optical system; and a further type of moving an imaging element.

A technique has been disclosed, for example, in Japanese patent Publication No. 2006-133740 as the type of moving the imaging element in which the imaging element is mounted on a board inside a housing by way of balls, and shakiness is compensated for by moving the board inside the housing.

However, the handshake compensation device disclosed in Japanese patent Publication No. 2006-133740 uses a flexible printed circuit board for exchanging signals between the imaging element and the outside control board. Therefore, when moving the imaging element in the imaging plane in order to compensate handshake, the flexible printed circuit board must also be moved.

In order to move the imaging element in the imaging plane against the repulsion force that occurs due to the flexure of the flexible printed circuit board, a large driving force is needed, which becomes an obstacle to compactness and saving of electric power of the imaging device.

SUMMARY OF THE INVENTION

Taking the aforementioned problems into consideration, it is an object of the present invention to obtain an imaging-element unit of compact and power saving type, and that is capable of compensating handshake, and to obtain an imaging device that is compact, has low power consumption and is capable of compensating handshake.

The object of the invention is accomplished as described below.

A first aspect of the invention is an imaging-element unit comprising:

an imaging-element board with an imaging element that performs photoelectric conversion of incident light formed or mounted thereon;

a relay board disposed between the imaging element and an external control board for receiving and transmitting signals between the imaging-element board and the external control board; and a package encompassing at least the imaging-element board and the relay board, wherein a slider mechanism is disposed between the imaging-element board and the relay board for moving the imaging-element board in a plane perpendicular to an optical axis of the imaging element unit.

A second aspect of the invention is the imaging-element unit of the first aspect described above wherein drive power is supplied to the imaging element by way of an electrical contact section of the slider mechanism.

A third aspect of the invention is the imaging-element unit of the first or second aspect described above wherein reception and transmission of signals between the imaging-element board and the relay board is performed in no contact way.

A fourth aspect of the invention is the imaging-element unit of any one of the aspects 1 to 3 described above wherein at least one of driving coils for moving the imaging-element board and a position detection sensor for detecting a position of the imaging-element board is arranged on the imaging-element board.

A fifth aspect of the invention is the imaging-element unit of any one of the aspects 1 to 3 described above wherein a driving coil for moving the imaging-element board is arranged on the slider mechanism.

A sixth aspect of the invention is the imaging-element unit of the fourth or fifth aspect described above wherein a magnet is arranged outside of the package opposing the driving coils.

A seventh aspect of the invention is the imaging-element unit of the fourth or fifth aspect described above wherein a magnet is arranged inside of the package opposing the driving coils.

An eighth aspect of the invention is that an imaging device comprises the imaging-element unit of any one of the first to seventh aspects described above, and an imaging optical system for directing a light from an object to the imaging-element unit, wherein said imaging device compensates handshake by moving said imaging-element board in a plane perpendicular to an optical axis of the imaging optical system.

With the present invention, a compact and power saving imaging-element unit that is capable of compensating handshake, and a compact and low power consuming imaging device that is capable of correcting for shakiness are provided.

The above and many other objects, features and advantages of the present invention will become manifest to those skilled in the art upon making reference to the following detailed description and accompanying drawings in which preferred embodiments incorporating the principle of the present invention are shown by way of illustrative examples.

DESCRIPTION OF THE PREFERRED EMBODIMENTS

The invention will now be explained in detail below with respect to the preferred embodiments, however, the invention is not limited to these embodiments.

Figure 1A:
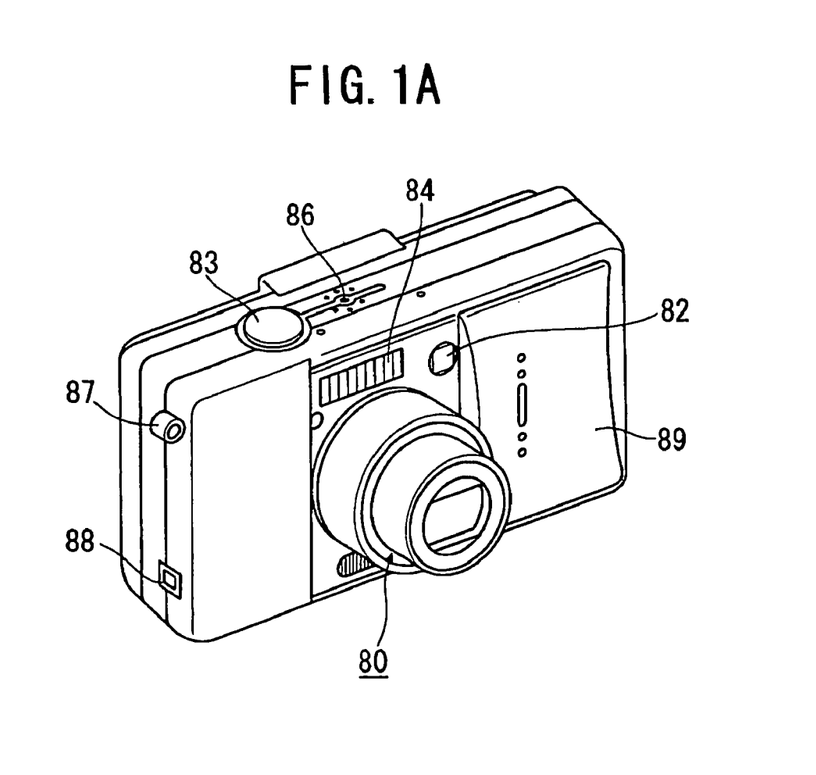
FIG. 1A is a perspective view illustrating a front side of a camera as an example of an imaging device in which an imaging-element unit according to an embodiment of the present invention is mounted and FIG. 1B is also a perspective view illustrating a back side of the camera shown in FIG. 1A.
Figure 1B:
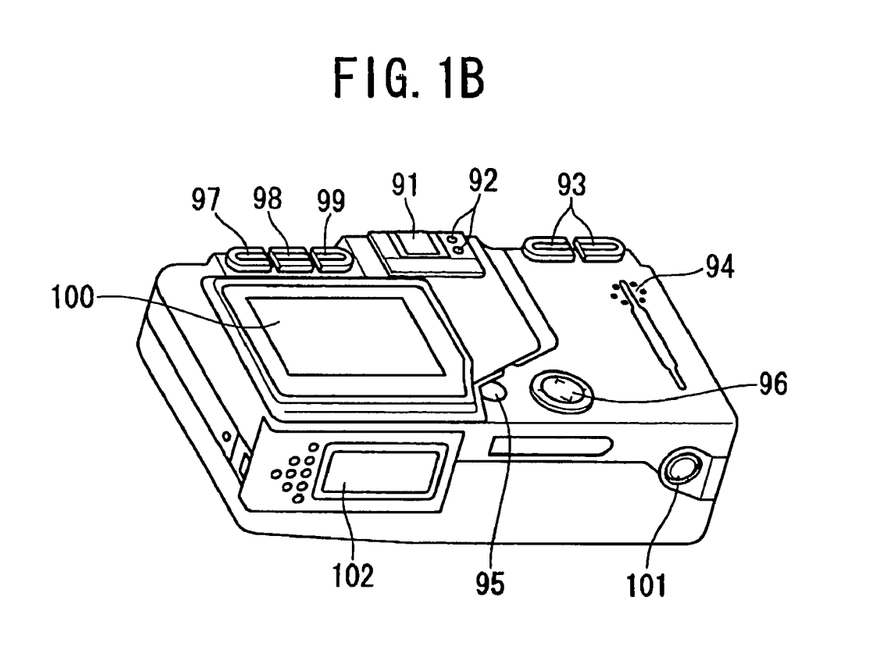

FIGS. 1A and 1B illustrate a camera as an example of an imaging device in which the imaging-element unit of an embodiment of the present invention is mounted wherein FIG. 1A is a perspective view of the front side of the camera, and FIG. 1B is a perspective view of the back side of the camera.

Referring to FIG. 1A, the camera includes a lens barrel 80, a finder window 82, a release button 83, a flash unit 84, a microphone 86, a strap attachment unit 87, a USB terminal 88 and a sliding cover 89. The lens barrel 80 retracts inside, when not taking images.

Referring to FIG. 1B, the camera has a finder lens section 91 and red and green display lamps 92 that display AF or AE information for a user by lighting up or flashing when the release button 83 is pressed. A zoom button 93 is provided for zooming in or zooming out. A speaker 94 is adapted to reproduce a sound recorded by the microphone 86, a releasing sound and so on. There are provided a menu/set button 95, a selection button 96 with four-way switch, and a LCD monitor 100 adapted to display the image and other character information. A delete button 99 is provided for deleting images that have been recorded. A tripod screw hole 101 and a battery/card lid 102 are also provided. A battery that supplies power to the camera, and a card-type removable memory in which taken images are recorded are loaded inside of the battery/card lid 102.

Figure 2:
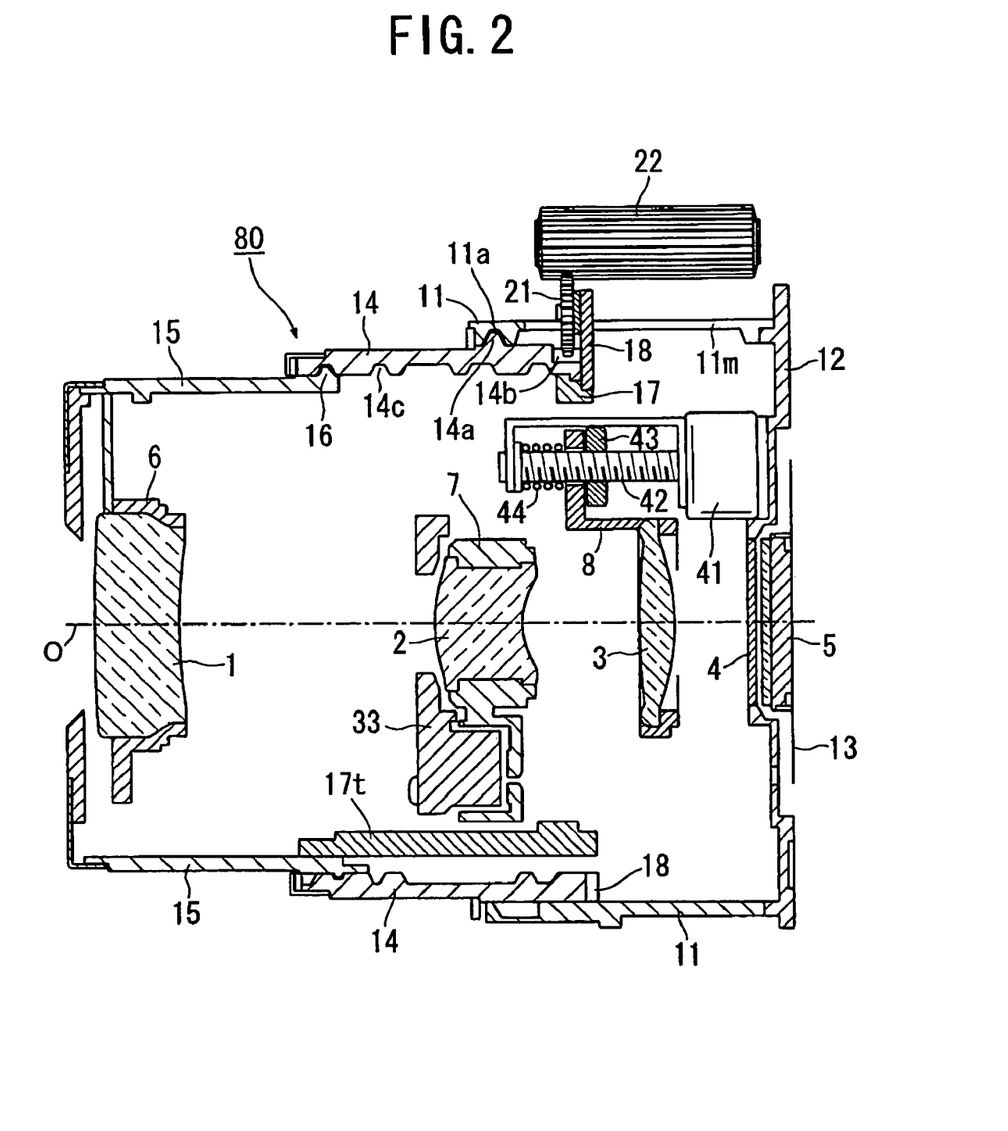
FIG. 2 is a cross-sectional view of a lens barrel of an imaging device with the imaging-element unit of the present invention mounted.

FIG. 2 is a longitudinal cross-sectional view of the lens barrel 80 of the imaging device taking a wide photographing position with the imaging-element unit 5 mounted.

Referring to FIG. 2, an imaging optical system comprises three lens groups including a first lens group 1, a second lens group 2 and a third lens group 3. For zooming operation, the first lens group 1 and the second lens group 2 are moved in the direction of the optical axis, and for focusing operation, the third lens group 3 is moved in the direction of the optical axis. An optical filter 4 is composed of lamination of an infrared-cut filter and an OLPF (optical low pass filter). The imaging-element unit 5 encompasses an imaging element which is adapted to photoelectrically convert focused light of an object and may be an image sensor such as, for example CCD (Charge Coupled Device) or CMOS (Complementary Metal-oxide Semiconductor).

The first lens group 1 is held by a first lens frame 6, the second lens group 2 is held by a second lens frame 7 and the third lens group 3 is held by a third lens frame 8.

An attachment cylinder 11 is attached integrally with the camera body (not shown) and has a cam groove 11a formed on its inner surface. A bottom board 12 is attached to the rear side of the attachment cylinder 11. The optical filter 4 and imaging-element unit 5 are mounted on the bottom board 12. The imaging-element unit 5 is electrically connected to a flexible printed circuit board 13.

A cam cylinder 14 has a cam pin 14a that fits in the cam groove 11a on the attachment cylinder 11, and has a partial gear 14b formed on a part of the rear section. A cam groove 14c is formed on the inner surface of the cam cylinder 14.

A front cylinder 15 holds the first lens frame 6 and has three metal cam pins 16 formed on the outer surface thereof. These cam pins 16 engage with the cam groove 14c of the cam cylinder 14.

There are also cam pins (not shown) formed on the second lens frame 7 which engage with another cam grooves that are different from the cam groove 14c of the cam cylinder 14.

A linear movement member 17 and a linear guide plate 18 are attached to the cam cylinder 14 so that they can rotate and move in the optical-axis direction of the cam cylinder 14. The linear guide plate 18 engages with a linear guide section 11m that is formed on the attachment cylinder 11 as shown, and pivotably supports a drive gear 21 that engages with the partial gear 14b. The drive gear 21 also engages with a long gear 22 which is driven by a motor and step-down gear train that are not shown in FIG. 2.

As shown in FIG. 2, the linear guide plate 18 makes direct contact with the ring-shaped surface on the imaging-element unit 5 of the cam cylinder 14, and slides while the linear movement member 17 makes direct contact with the inside surface of the cam cylinder 14 and slides. A linear guidance section 17t is formed on the linear movement member 17, and engages with the front cylinder 15 and the second lens frame 7 which are designed to guide the front cylinder 15 and the second lens frame 7 linearly. A diaphragm shutter unit 33 is attached to the second lens frame 7. It is also possible that the front cylinder 15 may be moved by the linear guide plate 17t linearly so that the second lens frame 7 is engaged with the linearly moving front cylinder 15 so as to be linearly guided.

A focusing motor 41 has a feed screw 42 onto which a nut 43, whose rotation is regulated, is screwed. The third lens frame 8 has its arm pressed against the nut 43 by a spring 44. With this arrangement, rotation of the focusing motor 41 causes the feed screw 42 to rotate, so that the nut 43 moves in the direction of the optical axis O, with the result that the third lens frame 8 is moved in the direction of the optical axis O to perform focusing and retraction of the third lens group 3.

With such construction, when another motor (not shown) is driven to rotate in a given direction, the cam cylinder 14 is rotated by the long gear 22 and the drive gear 21. As a result, the front cylinder 15 with the cam pins 16 in engagement with the cam groove 14c formed on the inner periphery of the cam cylinder 14, and the second lens frame 7 in engagement with the cam groove (not shown in the figure) formed on the cam cylinder 14 are linearly guided by the linear guide unit 17t and moved in the direction of the optical axis O to perform the zooming operation. In this way, the wide position shown in FIG. 2 is shifted to the telescopic position.

On the other hand, when it is expected to shift the wide position shown in FIG. 2 to the retracted position, the focusing motor 41 is first driven to move the third lens frame 8 toward the imaging-element unit 5, and after that another motor (not shown in the figure) is driven to in the opposite direction so that the long gear 22 and the drive gear 21 cause the cam cylinder 14 to rotate in the opposite direction. As a result, the cam cylinder 14 is guided by the cam groove 11a formed on the attachment cylinder 11 to move toward the imaging-element unit 5 and the front cylinder 15 with the cam pins 16 in engagement with the cam groove 14c formed on the inner periphery of the cam cylinder 14, and the second lens frame 7 in engagement with the cam groove (not shown in the figure) formed on the cam cylinder 14 are linearly guided by the linear guide unit 17t and moved in the direction of the imaging-element unit 5 to the retracted position as shown in the figure. At this time, the linear movement member 17 and the linear guide plate 18 move linearly together with the cam cylinder 14.

The construction and operation of the lens barrel 80 has been described above. Next, the imaging-element unit 5 of this embodiment will be explained in detail.

Figure 3:
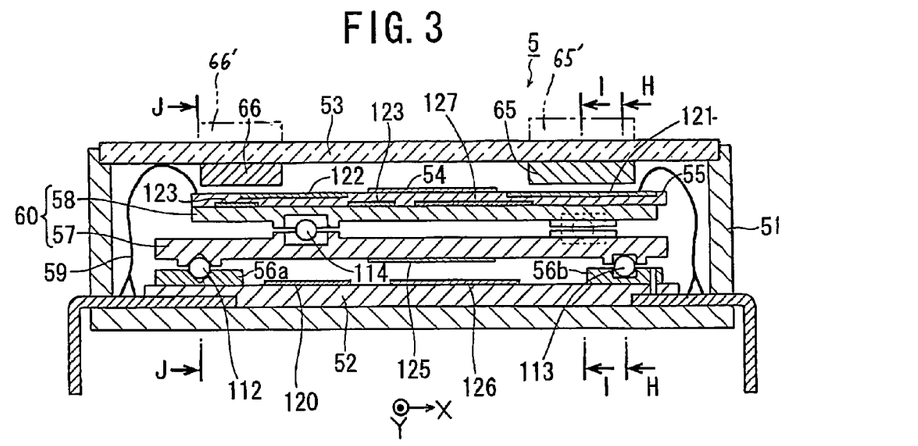
FIG. 3 is a cross-sectional view of the imaging-element unit of the embodiment of the present invention.

FIG. 3 is a cross-sectional view of the imaging-element unit 5 of the embodiment of the present invention and particularly illustrates its internal structure.

The imaging-element unit 5 has a package 51, a relay board 52 that is connected to the flexible printed circuit board 13 as shown in FIG. 2 for connecting to an external control board, and a cover glass plate 53.

An imaging element 54 comprises light receiving elements arranged in a two-dimensional array formed on an imaging-element board 55. In this embodiment, the imaging element 54 and imaging-element board 55 are formed of the same silicon chip. The imaging-element board 55 and the relay board 52 are electrically connected by wire bonding 59.

A slider mechanism 60 is arranged between the imaging-element board 55 and the relay board 52 to enable surface displacement in X and Y directions that is orthogonal to the optical axis O. The slider mechanism 60 comprises a first slider 57 arranged by way of balls on an attachment unit 56 that is fixedly mounted on the relay board 52 and a second slider 58 arranged by way of balls on the first slider 57. The imaging-element board 55 is fixedly mounted on the second slider 58. The imaging-element board 55 is adapted to move in two perpendicular directions (X and Y directions within a planes orthogonal to the optical axis O by movement of the slider 57 and the second slider 58.

Moreover, magnets 65 and 66 are arranged on the back surface of the cover glass 53. These magnets may be arranged on the front surface of the cover glass 53 as shown in FIG. 3 by a double chain line.

Figure 4:
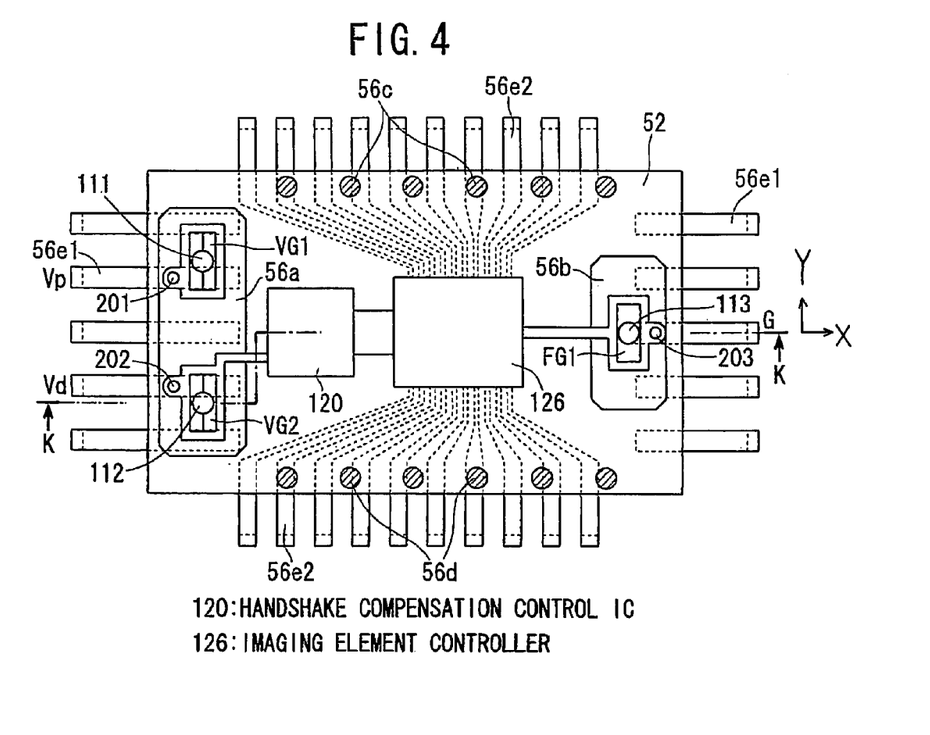
FIG. 4 is a plan view of a relay board of the attachment unit mounted on the bottom of the image-element unit.

FIG. 4 is a plan view of the relay board 52.

Figure 5A:
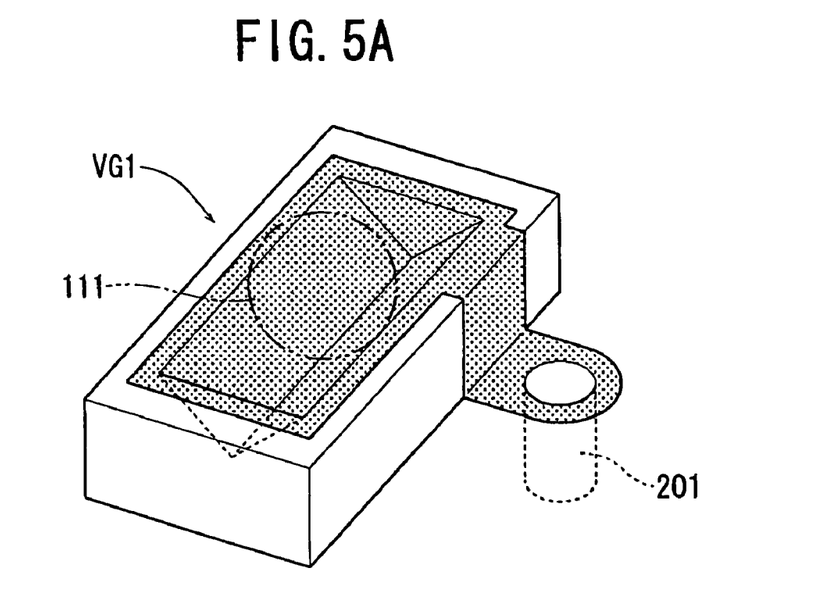
FIG. 5A shows an example of ball receiving member.
Figure 5B:
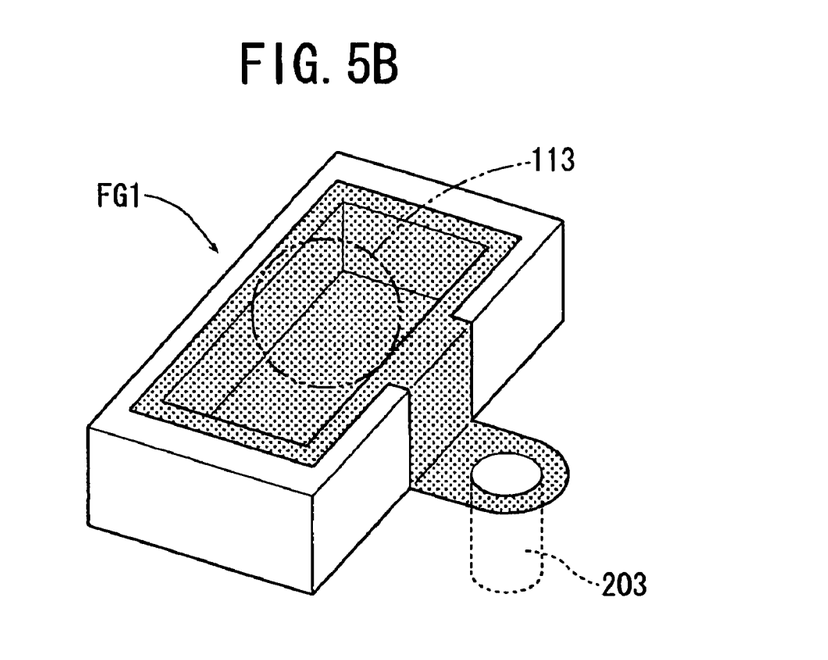
FIG. 5B show another example of a ball receiving member.

Referring to FIG. 4, there are two lands 56a and 56b integrally formed on the upper surface of the relay board 52. On the land 56a are formed two V-shaped grooves VG1 and VG2 whose bottom is V-shaped in section and on the land 56b is formed a single groove FG1 whose bottom is flat. The V-shaped grooves VG1 and VG2 are exactly the same and therefore the V-shaped groove VG1 as an example and the groove FG1 are illustrated in FIG. 5A and FIG. 5B, respectively. Balls 111, 112 and 113 which are arranged in the V-shaped grooves VG1 and VG2 and the groove FG1, respectively are made of metallic material or has a coating of electrically conductive material on their surfaces. There are electrically conductive patterns formed on the portion of the surface and the bottom of the V-shaped groove VG1 and VG2 and the groove FG1 with which the balls 111, 112, 113, are in physical and electrical contact. The conductive patterns formed on these grooves VG1 and FG1 are shown by a dotted area in FIGS. 5A and 5B. On the relay board 52 are also mounted a handshake compensation control integrated circuit 120 and an imaging element controller 126. Along one side and opposite side of the relay board 52 are provided a plurality of soldering lands 56c and 56d shown by hatched lines for connection to outside circuits not shown. A plurality of lead frames 56e1 and 56e2 extend from the relay board 52 wherein an electric power Vp is supplied through one of the lead frames 56e1 and control signals are led through the lead frames 56e2. More specifically, power-supply Vp for the relay board 52, power supply Vd for digital circuits and ground line G are connected to the balls 111, 112 and 113 through the conductive patterns formed on the ball receiving members from lead frames 56e1. Control signals to and from the imaging elements controller 126 are lead through the lead frames 56e2.

Slider mechanism 60 will be described in detail with reference to FIGS. 6A, 6B and FIGS. 7A, 7B.

Figure 6A:
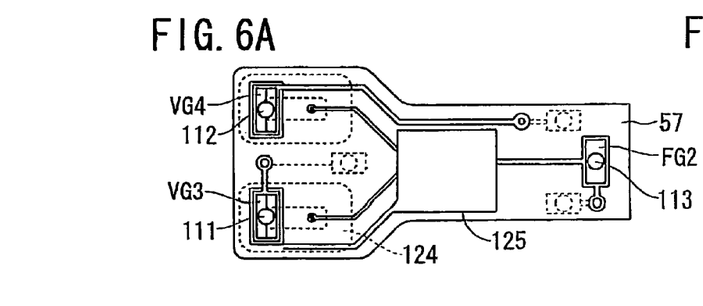
FIG. 6A is a top view of one surface of a first slider opposing the attachment unit and FIG. 6B is a top view of the other surface of the first slider opposing another slider.
Figure 6B:
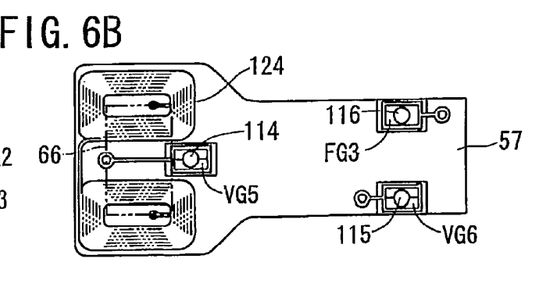

FIGS. 6A and 6B show respective surfaces of the first slider 57. More specifically, FIG. 6A shows the surface of the first slider 57 opposing the relay board 52 and FIG. 6B shows the surface of the slider 57 opposing the second slider 58.

As shown in FIG. 6A, there are two V-shaped grooves VG3 and VG4 and a groove FG2 formed on the surfaces of the first slider 57 in which the balls 111, 112 and 113 are placed, respectively.

When the first slider 57 is place in position in parallel to the relay board 52, the V-shaped grooves VG3 and VG4 oppose the V-shaped grooves VG1 and VG2 on the relay board 52, respectively. The groove FG2 on the first slider 57 also oppose the groove FG1 on the relay board 52. The V-shaped grooves VG3 and VG4 and the groove FG2 are of the same structure as the V-shaped grooves VG1 and VG2 and the groove FG1 shown in FIGS. 5A and 5B, respectively. On the centre of the surface of the first slider 57 is also arranged an yaw-direction driver circuit 125. With this structure, the power-supply Vp, the power-supply Vd for digital circuits and the ground line G are connected to the first slider 57 through the balls 111, 112 and 113 and the relay board 52.

On the opposite surface of the first slider 57, there are three grooves formed as shown in FIG. 6B. The grooves VG5 and VG6 are V-shaped grooves as shown in FIG. 5A and the groove FG3 is the groove shown in FIG. 5B. A set of balls 114, 115 and 116 are placed in the V-shaped grooves VG5 and VG6 and the groove FG3, respectively. There is also a Y coil 124 for generation of an electromagnetic force by cooperation with a magnet 66 arranged on the cover glass plate 53 for driving the imaging-element board 55 in the yaw direction which is formed on the same surface of the first slider 57.

As a result, the power-supply Vp, the power-supply Vd for the digital circuits and the ground line G are connected to the surface of the first slider 57 opposing the second slider B 58 by way of through holes as shown in FIG. 6B. The power-supply Vp is connected to the ball 114, the power supply for the digital circuits Vd is connected to the ball 115 and the ground line G is connected to the ball 116 through the conductive patterns formed at the positions connecting to the through holes.

Figure 7A:
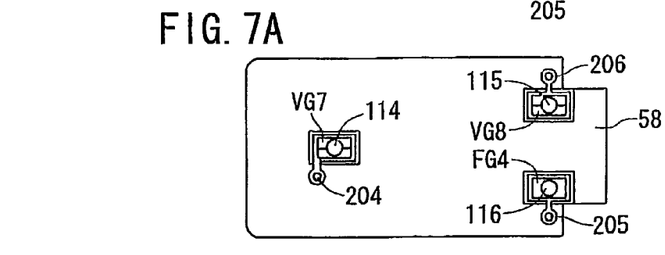
FIG. 7A is a top view of one surface of a second slider opposing the first slider and FIG. 7B is a top view of the other surface of the second slider attached onto an imaging-element board.
Figure 7B:
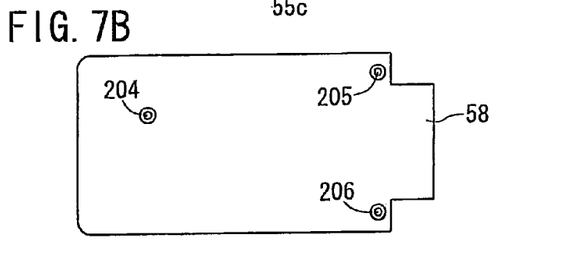

FIG. 7A shows the surface of the second slider 58 opposing the first slider 57 and FIG. 7B shows the surface of the second slider 58 which is attached to the imaging-element board 55.

As shown in FIG. 7A, there are two V-shaped grooves VG7 and VG8 and a groove FG4. These grooves VG7, VG8 and the groove FG4 are those shown in FIGS. 5A and 5B. In FIG. 7B, only through halls 204, 205 and 206 can be viewed.

Figure 8A:
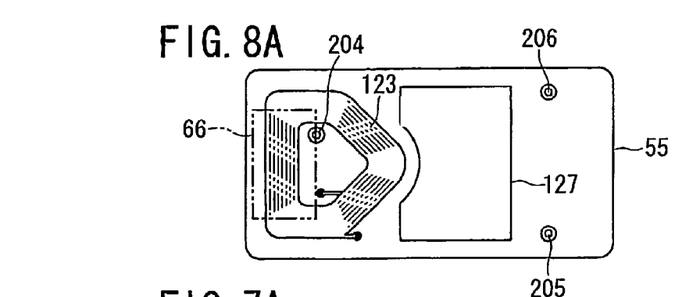
FIG. 8A is a top view of one surface of the imaging-element board to which the second slider is attached and FIG. 8B is a top view of another surface of the imaging element board.
Figure 8B:
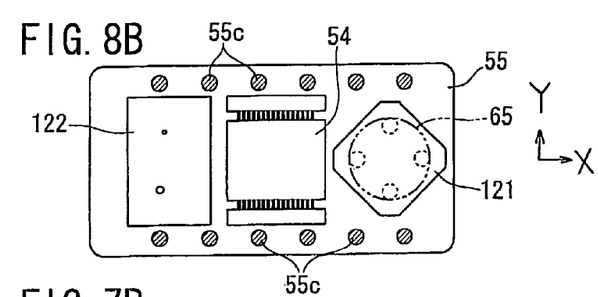

FIGS. 8A and 8B show the respective surfaces of the imaging-element board 55.

On the surface of the imaging-element board 55 shown in FIG. 8A to which the second slider 58 is attached, a P coil 123 for generation of an electromagnetic force by cooperation with the magnet 66 arranged on the cover glass plate 53 for driving the imaging-element board 55 in the pitch direction and an imaging-element controller 127 are provided. The P coil 123 is positioned to cooperate with the magnet 66 disposed on the rear side of the cover glass plate 53.

On the opposite surface of the second slider 58 as shown in FIG. 8B are provided the imaging element 54, a pitch-direction driver circuit 122 for driving the P coil 123 and a two-axis Hall element sensor 121 which functions as a position detection sensor. The two-axis Hall element sensor 121 is positioned to oppose a magnet 65 disposed on the rear side of the cover glass plate 53. Along the opposite sides of the imaging-element board 55 are provided a plurality of soldering lands 55c for wire bonding as shown by hatched lines.

Figure 9:
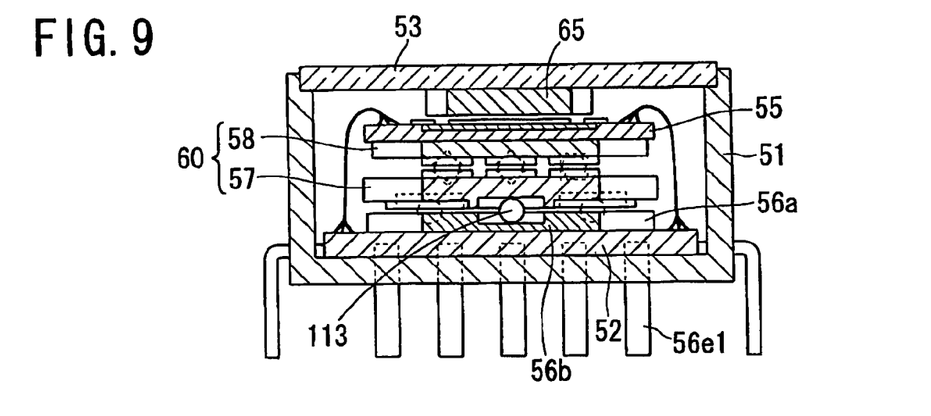
FIG. 9 is a sectional view of the imaging element unit taken along the line H-H in FIG. 3.
Figure 10:
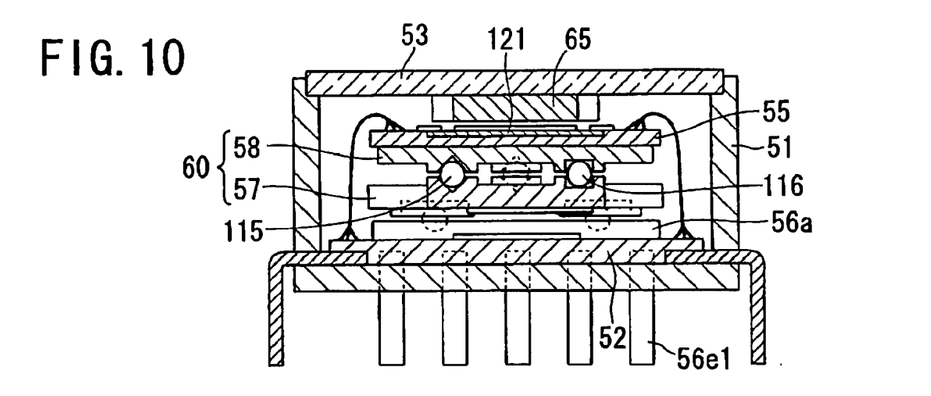
FIG. 10 is a sectional view of the imaging element unit taken along the line I-I in FIG. 3.
Figure 11:
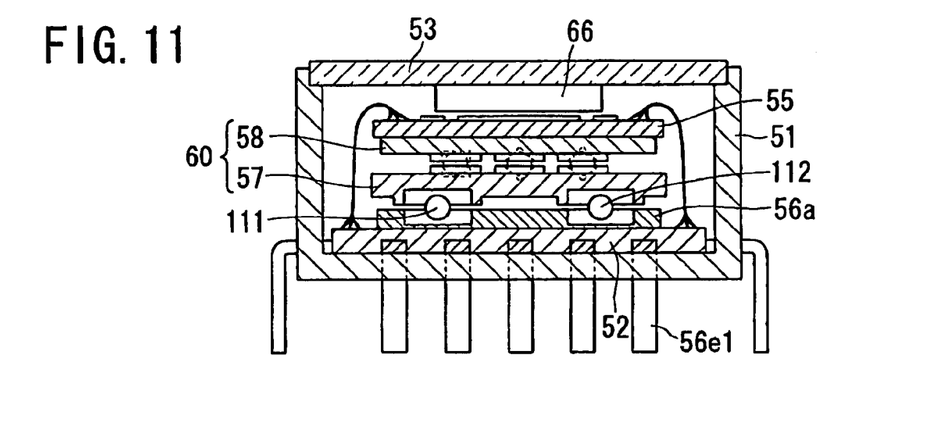
FIG. 11 is a sectional view of the imaging element unit taken along the line J-J in FIG. 3.

FIGS. 9, 10 and 11 are sectional views taken along the lines H-H, I-I and J-J in FIG. 3, that are presented for easy understanding of the inside structure of the slider mechanism 60.

Figure 12:
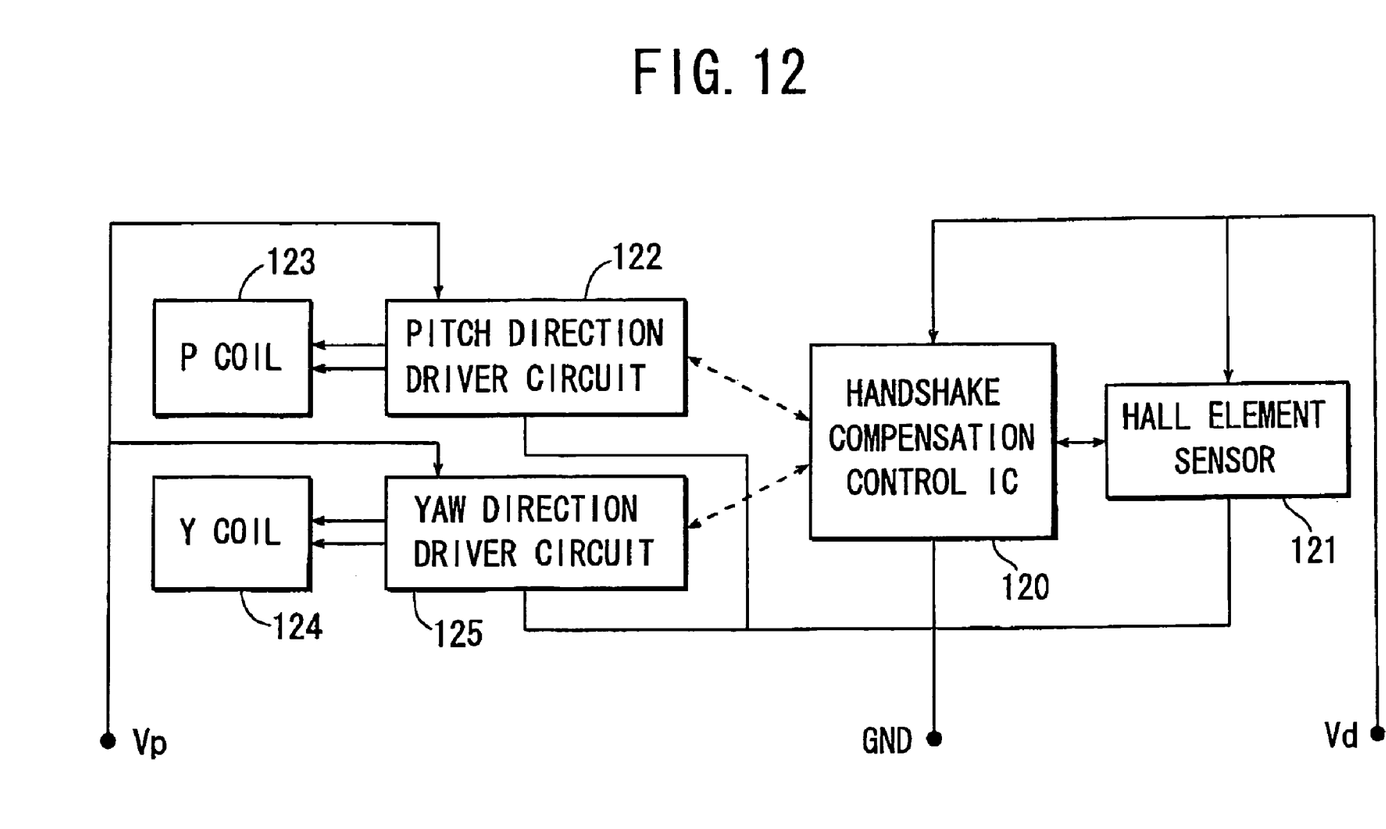
FIG. 12 shows a block diagram of the shakiness-compensation control circuit.

FIG. 12 shows a block diagram of the connection for power supply to the handshake compensation control circuit.

The power-supply Vp is supplied to the pitch-direction driver circuit 122 and the yaw-direction driver circuit 125, and the power-supply Vd for digital circuits is supplied to the handshake compensation control IC 120 mounted on the relay board 52 and the two-axis Hall element sensor 121. The ground line G is connected to all of the driver circuits 122 and 125, the control IC 120 and the two-axis Hall element sensor 121.

An operation of handshake compensation for the imaging-element unit 5 will now be explained.

A camera to which the present invention is applied has a sensor (not shown in the figure) that detects shakiness of the camera in the pitch direction (Y direction), and another sensor (not shown in the figure) that detects shakiness of the camera in the yaw direction (X direction). Based on the outputs of these sensors in two directions, the handshake compensation control IC 120 controls the pitch-direction driver circuit 122 and the yaw-direction driver circuit 125, so that current flows in the P coil 123 and the Y coil 124. This results in planar movement of the imaging-element board 55. The amount of planar movement of the imaging-element board 55 is detected by the two-axis Hall element sensor 121, and feedback is provided to the current flowing in the P coil 123 and the Y coil 124. Thus, the shakiness correction operation is effected by such feedback control of the movement of the imaging-element board 55.

It is preferred in the embodiment described above that the driving power be supplied to the imaging-element unit 5 by way of the control portion of the slider mechanism 60. This results in reduction of driving load in comparison with a conventional imaging device in which driving power is supplied to the imaging-element unit by way of a connecting wire, so that the slider mechanism 60 can move with a small driving force, and compactness of the unit and power saving are realized.

Figure 13:
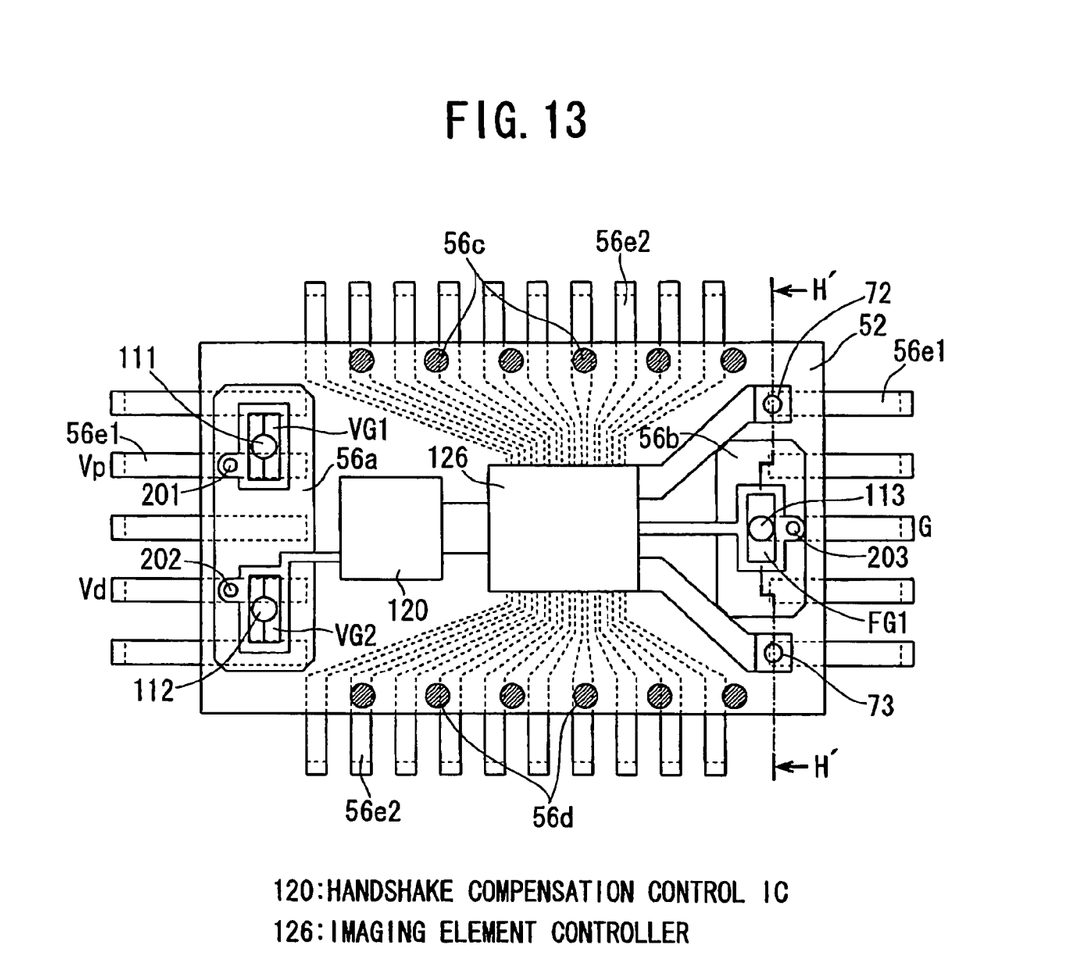
FIG. 13 is a plan view of the attachment unit of another embodiment of the relay board of the present invention which is similar to FIG. 4
Figure 14:
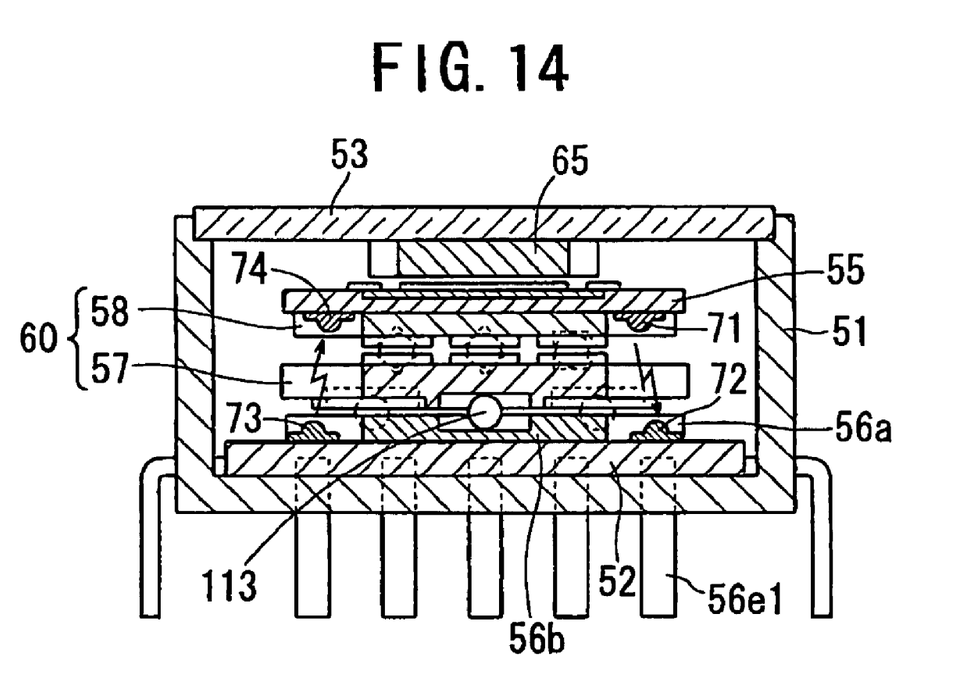
FIG. 14 is a sectional view of the embodiment shown in FIG. 13 which is similar to FIG. 9.

FIG. 13 is a plan view of the attachment unit of another embodiment of the relay board of the present invention which is similar to FIG. 4. FIG. 14 is a cross sectional view of the attachment unit taken along a line H'-H' of FIG. 13 which is similar to FIG. 9. In these figures, the same reference numbers will be assigned to parts that are identical to those of the imaging-element unit 5 of FIG. 4, in order to avoid redundancy in the explanation.

Referring to FIGS. 13 and 14, a light-emitting element 71 such as for example a light-emitting diode is arranged on the imaging-element board 55, and a light-receiving element 72 such as for example, a photodiode is arranged in the corresponding position on the relay board 52. A light-emitting element 73 is arranged on a different position on the relay board 52 while a light-receiving element 74 is arranged in the corresponding position on the imaging-element board 55.

A control signal from the external control board is transmitted to the imaging-element board 55 by a pair of the light-emitting element 73 and the light-receiving element 74. An image signal that is obtained by the imaging element 54 is transmitted to the relay board 52 by a pair of the light-emitting element 71 and the light-receiving element 72, and then is transmitted outside the imaging-element unit 5. In other words, reception and transmission of a signals between the imaging-element board 55 and the relay board 52 are performed by non-contact type optical communication.

Reception and transmission of signals between the imaging-element board 55 and relay board 52 are not limited to optical communication, but may be realized by electromagnetic waves.

As explained above, it becomes possible to obtain a compact and power saving imaging-element unit that comprises an imaging-element board, a relay board and a package encompassing at least the imaging-element board and the relay board, by providing a slider mechanism between the imaging-element board and the relay board for moving the imaging-element board, whereby only the lightweight imaging-element board is moved for compensating handshake and displacement is possible with a small driving force. Furthermore, it becomes possible to obtain a compact and power saving function by providing such imaging-element unit.

In the embodiments described above, the imaging element 54 and the imaging-element board 55 are formed from the same silicon chip. However, the invention is not limited to this embodiment but the imaging-element board 55 may be integrally formed from a normal printed circuit board, and the imaging element 54, two-axis Hall element sensor 121 and the driving coil 122 may be formed on that board. A plurality of balls may be arranged in a single V-shaped groove VG and groove FG.

It is possible to arrange one of the two-axis Hall element sensor 121 and the driving coil 121 on the imaging-element board 55, and to arrange the other on the seconder slider 58 of the slider mechanism 60.

Moreover, in the embodiment described above, an optical filter 4 is arranged as a separate member in front of the cover glass 53, however, the cover glass 53 may function as an OLPF as well.

Furthermore, in the embodiment described above, a normal camera was explained as an example of the imaging device. However, it is needless to say that the imaging-element unit 5 with shakiness correction function of the invention can be applied to an imaging device such as camera module incorporated in a mobile telephone, PDA or the like.

The invention is not limited to the embodiments or the example as described above, and suitable modification can be made within the range consistent with the content or idea of the invention, which can be read from the claims and the entire specifications, and a display apparatus or a method accompanying such changes is also included in the technical idea of the invention.

What is claimed is:

1. An imaging-element unit comprising:
   an imaging-element board with an imaging element for photoelectric conversion of incident light formed or mounted thereon;
   a relay board disposed between said imaging element and an external control board for receiving and transmitting signals between said imaging-element board and said external control board; and
   a package encompassing at least said imaging-element board and said relay board,
   wherein a slider mechanism is disposed between said imaging-element board and said relay board for moving said imaging-element board in a plane perpendicular to an optical axis of the imaging-element unit.

2. The imaging-element unit of claim 1, wherein drive power is supplied to said imaging element by way of an electrical contact section of said slider mechanism.

3. The imaging-element unit of claim 2, wherein reception and transmission of signals between said imaging-element board and said relay board is performed in no contact way.

4. The imaging-element unit of claim 1, wherein at least one of driving coils and a position detection sensor for detecting a position of the imaging-element board is arranged on said imaging-element board.

5. The imaging-element unit of claim 1 wherein a driving coil for moving the imaging-element board is arranged on said slider mechanism.

6. The imaging-element unit of claim 4, wherein a magnet is arranged outside of said package opposing said driving coils.

7. The imaging-element unit of claim 4, wherein a magnet is arranged inside of said package opposing said driving coils.

8. The imaging-element unit of claim 1, wherein reception and transmission of signals between said imaging-element board and said relay board is performed in no contact way.

9. An imaging device comprising the imaging-element unit of claim 1, and an imaging optical system for directing a light from an object to said imaging-element, unit, wherein said imaging device compensates for shakiness by moving said imaging-element board in a plane perpendicular to an optical axis of said imaging optical system.

* * * * *